UNITED STATES PATENT OFFICE.

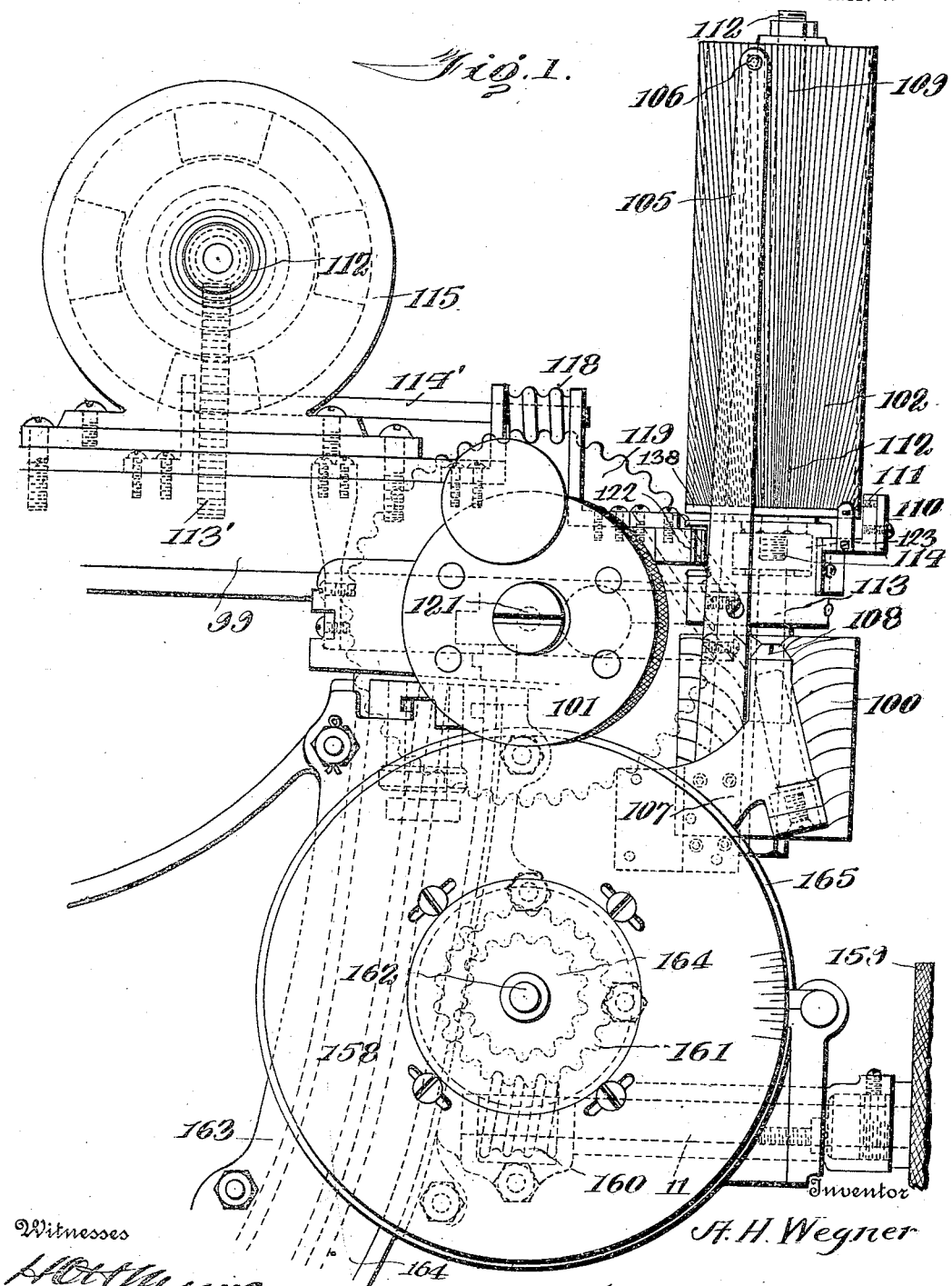

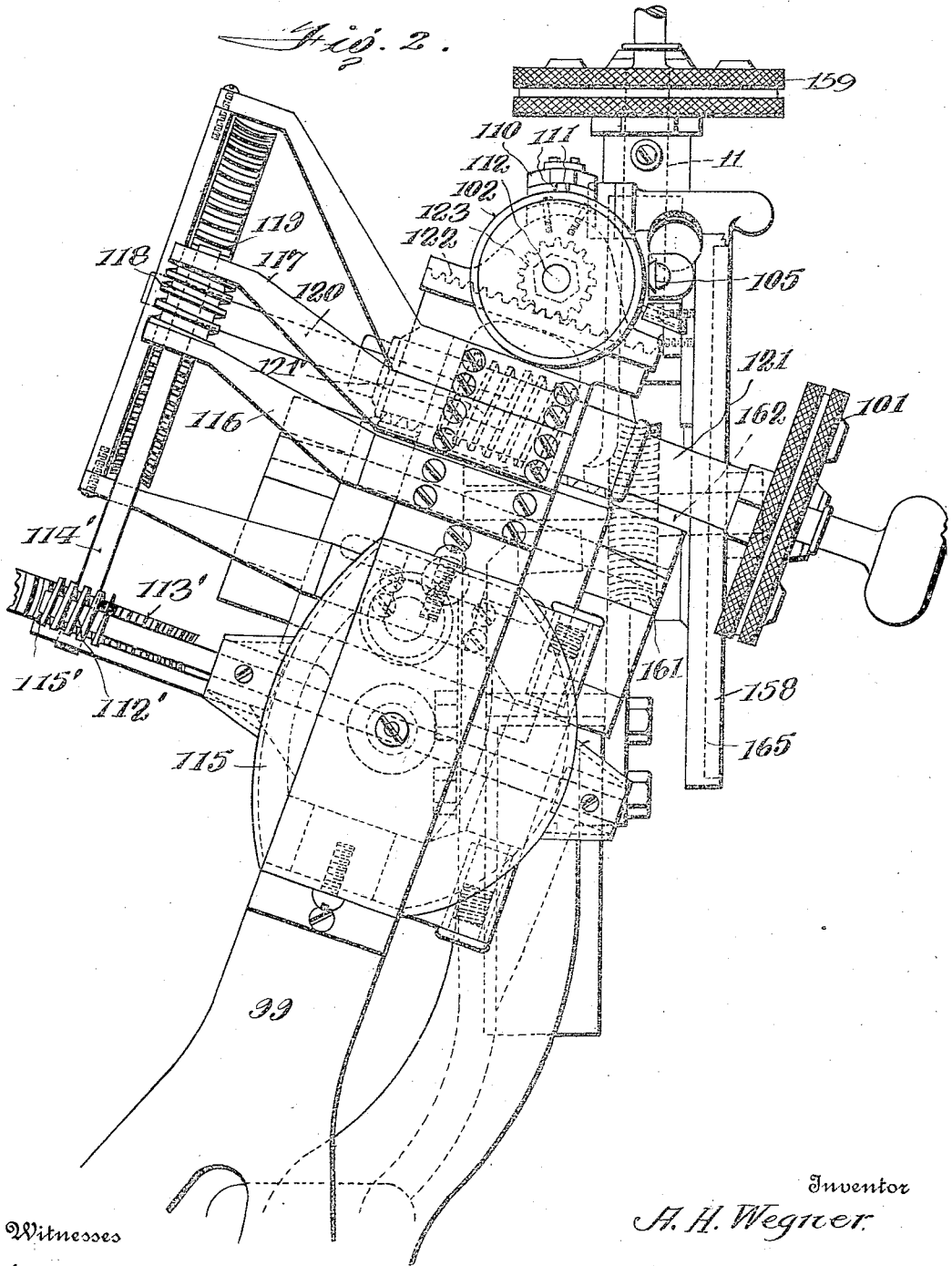

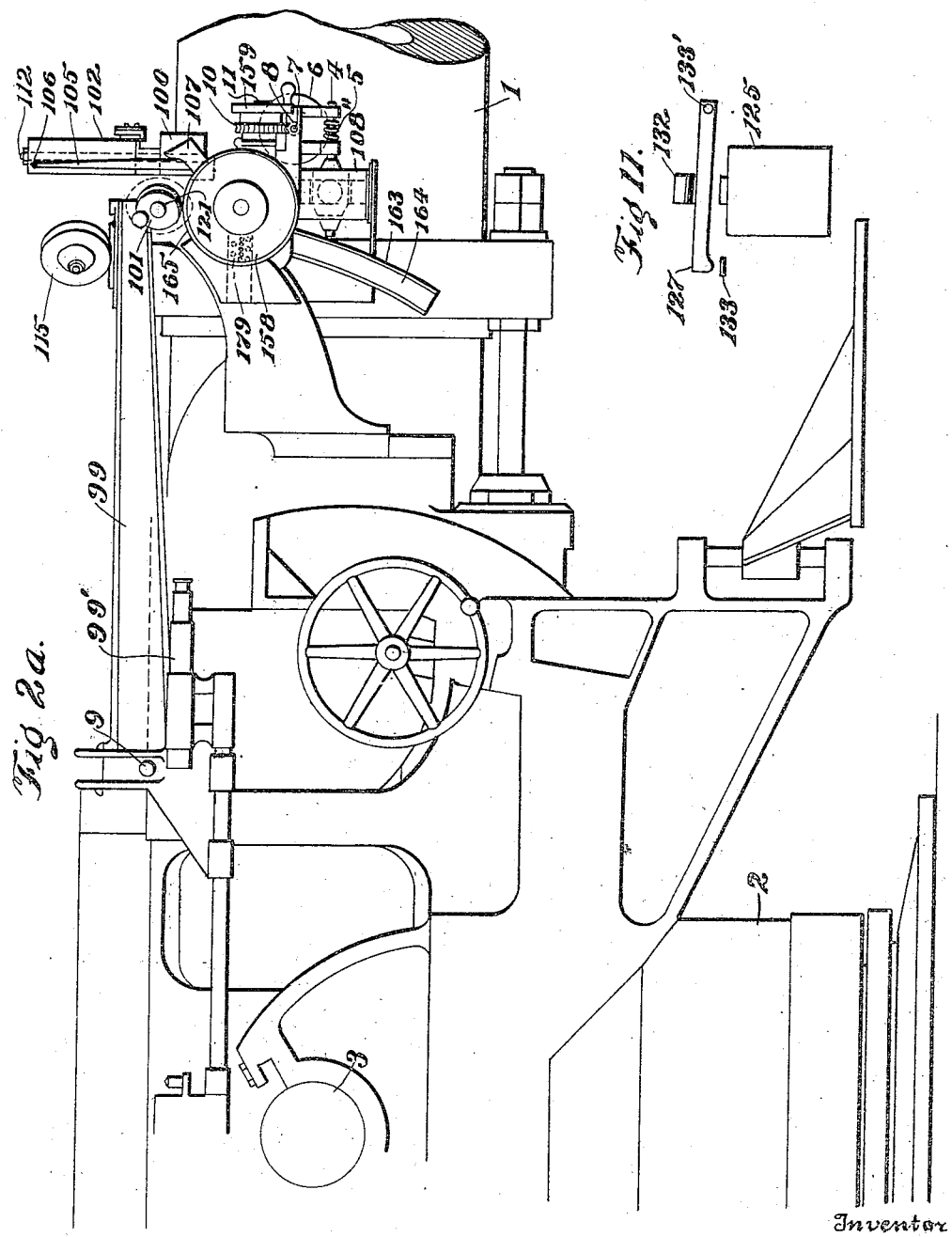

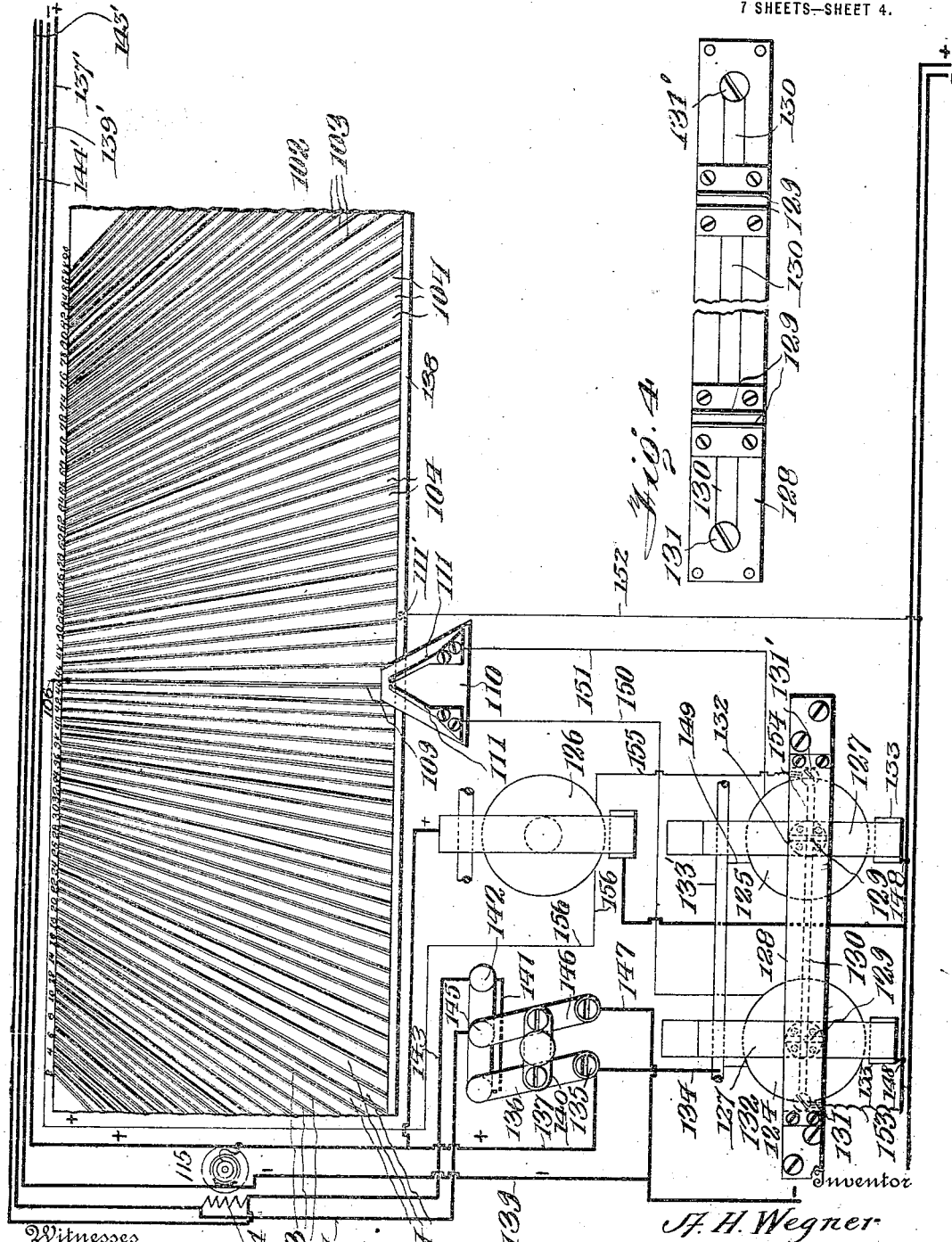

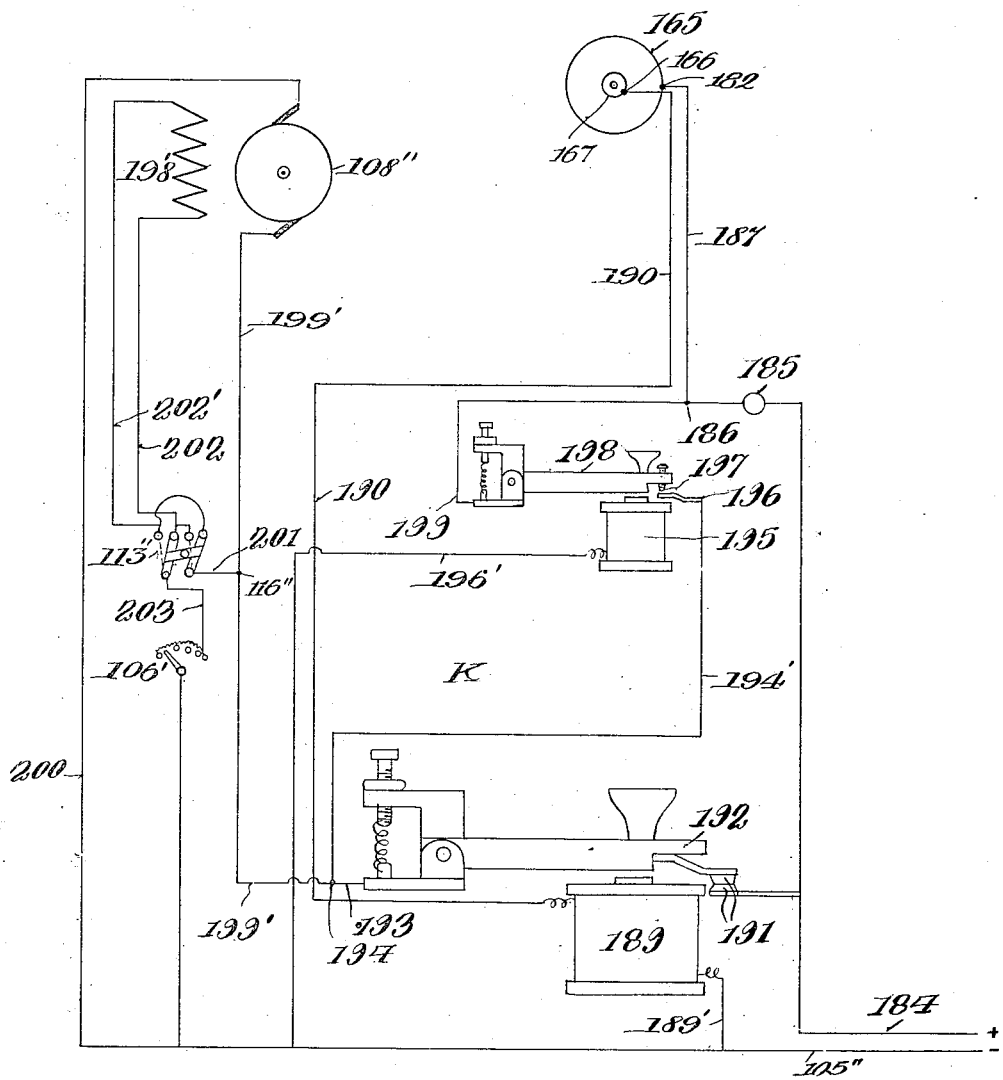

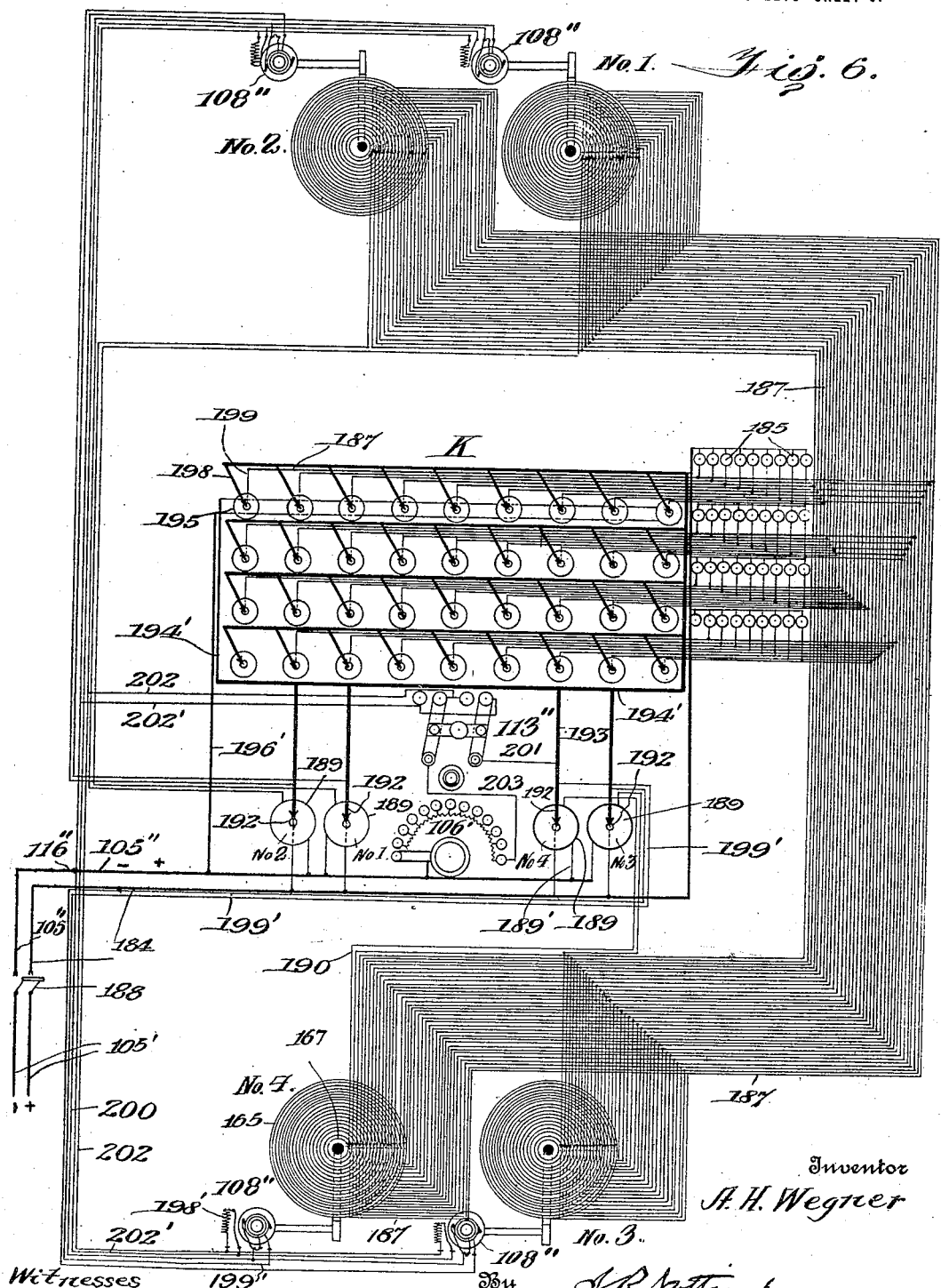

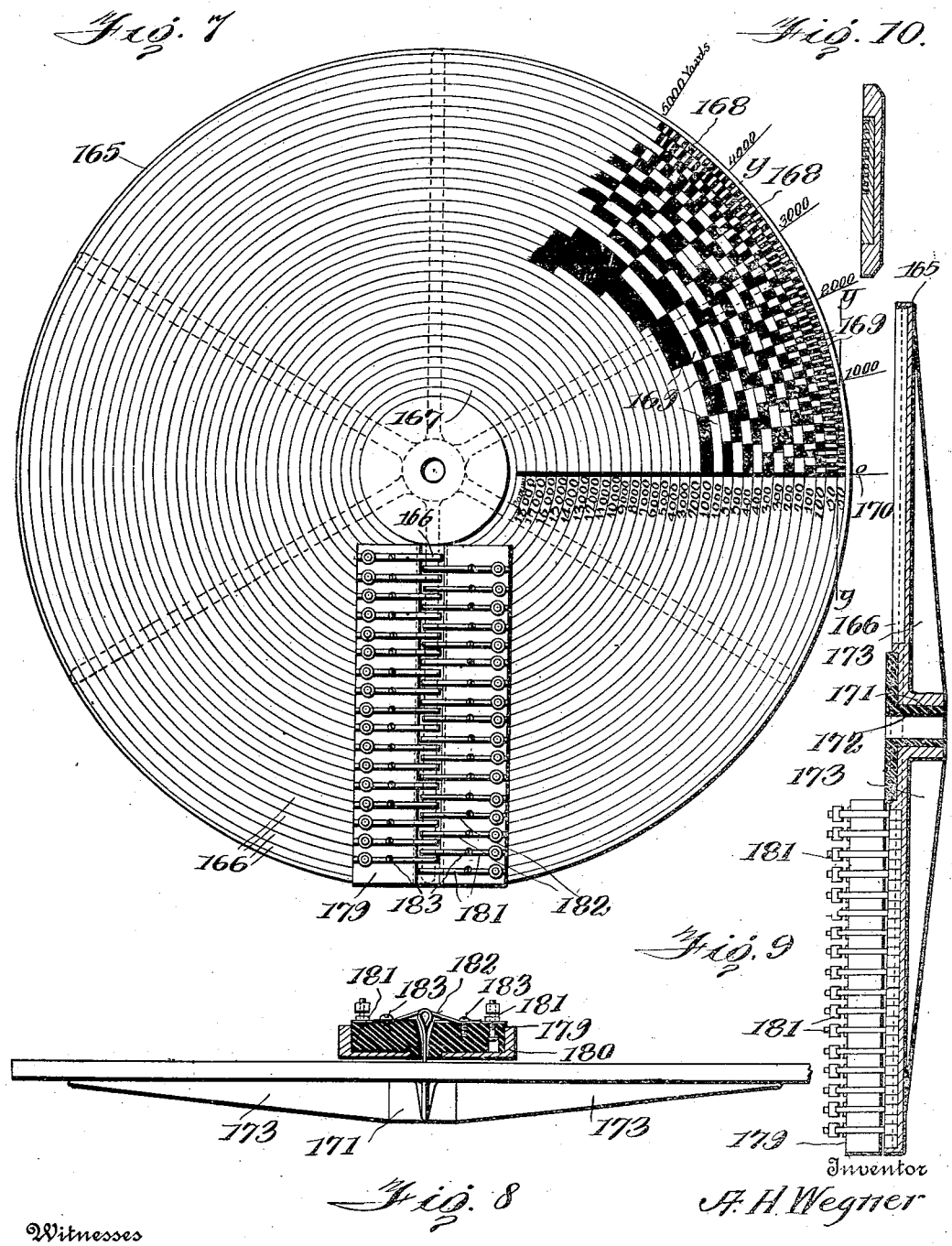

ARTHUR H. WEGNER, OF WASHINGTON, DISTRICT OF COLUMBIA, ASSIGNOR TO WEGNER CONTROL SYSTEM, INCORPORATED, OF PORTSMOUTH, NEW HAMPSHIRE.

SYSTEM OF ELECTRICALLY SETTING THE SIGHTS OF GUNS.

1,189,213. Specification of Letters Patent. Patented June 27, 1916.

Application filed May 2, 1912. Serial No. 694,687.

*To all whom it may concern:*

Be it known that I, ARTHUR H. WEGNER, a citizen of the United States, residing at Washington, District of Columbia, have invented certain new and useful Improvements in Systems of Electrically Setting the Sights of Guns; and I do hereby declare the following to be a full, clear, and exact description of the invention, such as will enable others skilled in the art to which it appertains to make and use the same.

This invention relates generally to a system of electrically controlling the firing of guns, but more particularly to setting the sights of guns, especially guns of heavy caliber, wherein the movements such as elevation and lowering the sights, and right and left deflection may be transmitted from a key-board to the sights of a number of guns in parallel, and it consists chiefly of the novel arrangement of certain electrical devices and circuits, whereby the ascertained range or change of range, and the azimuth movements may be transmitted to the sight of a number of guns, hence the chief object of the invention is to provide a system by means of which the sights of a gun or a number of guns in parallel, may be set by electrical means.

Still another object of the invention is to provide means for automatically indicating that the ascertained range has been transmitted, and the range at which the gun or guns was or were last fixed, as the case may be.

Other objects of the invention will become apparent upon the complete description of the same.

In the drawings Figure 1 is a side elevation of the parts of the mechanism that are ordinarily carried by a gun, with my improvements which relate to deflection control added thereto. Fig. 2 is a top plan view of the same. Fig. 2ᵃ is a side elevation, of enough of a gun to illustrate where my improvements, hereinafter described, are applied. In Figs. 1 and 2 no attempt is made to show my improvements in the range controller. Fig. 3 is a diagrammatic view of circuits and electrical devices for operating my improved azimuth drum, the drum being shown flattened out. Fig. 4 is an under plan view of the hard rubber strip with contacts hereinafter described mounted thereon. Fig. 5 is a diagrammatic view of the wiring of a single gun showing that portion of the system concerned with the control of the range. Fig. 6 is a diagrammatic view of my electric sight setting system in which the sights of one or more guns of a group of four, or the entire group, may be electrically controlled or operated, showing that portion of the system relating to the control of the range. Fig. 7 is a side elevation of one of the range controllers employed for electrically controlling the setting of the ascertained range to each gun of the group. Fig. 8 is an edge view of the same, partly in section. Fig. 9 is a central section, taken longitudinally through the finger-control-board. Fig. 10 is a section on line $y-y$ of Fig. 7 showing the alternating contact surfaces and insulating spaces in the outer ring. Fig. 11 is a detail side elevation of one of the key armatures shown in Fig. 3 and coöperating switch relay, which, specifically, forms no part of my invention.

Referring first to Fig. 2ᵃ I have shown a portion of the breech and carriage of an ordinary six-inch type of gun provided with the usual hand-operated mechanism for setting the sights of the gun, said figure also showing some of the parts of my improvements. The gun 1 is supported by the carriage 2 on trunnions 3. The usual sight bar 99 carrying a telescopic sight 99' is pivotally supported at 9, and has the usual rack bar 164 which is engaged by a pinion carried by the range dial shaft 162 which may be operated by the usual hand wheel 159. My improvements, as will be described, provide for operating the shaft 162 by power from motor 108" having its shaft 4 provided with a worm 5 engaging worm wheel 6 carried by shaft 7. The shaft 7 also has a worm 8 engaging worm wheel 10 on the shaft 11. The hand wheel 159 referred to is also carried by the shaft 11. It is to be understood that in practice, with the construction so far described, having the shaft 11 adapted to be rotated by hand as well as by power, it will be necessary to provide a suitable clutch to disengage some members, such as the worm 8 from worm wheel 10, in order to enable hand operation to be performed. Such however, forms no part of my invention, and is neither illustrated nor claimed herein.

I have shown the parts as described chiefly to illustrate how and where my improvements are applied, and it is to be understood that when my improvements are in place the hand wheel is not to be used (unless such a clutch as mentioned is employed) and may therefore be discarded.

The pinion, hereinbefore referred to as carried by shaft 162, is indicated at 164' in Fig. 1. The shaft 162 also has a worm wheel 161 engaged by worm 160 carried by shaft 11. By these connections, the elevation or depression of the sight bar and sight may be effected by the motor 108'' when the latter is in operation by the means hereinafter described.

The range dial 158 shown in Figs. 1, 2 and 2ª, is the ordinary dial now in use, being mounted on the usual shaft 162 and provided with the usual graduated range-marks, and mounted on said shaft at any convenient point, preferably in the rear of the range-dial 158 is my improved range-controller 165, constructed of a number of concentrically-arranged metallic rings (Fig. 7) each of which, except the inner ring 167, which serves as a common negative contact, is provided with alternately arranged insulated areas 168 and metal contact areas 169 representing range divisions. This range controller 165 is, of course, electrically isolated by any suitably arranged insulation not necessary to illustrate in Figs. 1 and 2 (see Figs. 7 and 9). Beginning at zero mark (170) the divisions of the first two rings represent fifty yards each; those of the next two rings representing one-hundred yards each, each pair thereafter increasing one hundred yards until the five-hundred yard rings are reached, when the divisions of the next pair of rings are increased to one thousand yards each, and thereafter each ring is increased one thousand yards, the last ring representing eighteen thousand yards. The graduations of these rings correspond with the graduated marks on the dial 158, and keep in step therewith, so that a range, which has been transmitted from a conning-tower or other fixed station, will be indicated on both the range-dial and the range-controller 165.

The range-controller is provided on its rear face with a hub 171, in the bore of which is seated a flanged bushing 172 of suitable insulating material, so as to insulate the range-controller from its shaft 162. The range-controller near its contact face is provided with a finger-board 179 of hard rubber seated in and secured to a suitable base 180 by any suitable means, not shown. The finger-board, the location of which is indicated by dotted lines in Fig. 2ª, is provided with a central line of perforations (Figs. 8 and 9) for the reception of spring contact-fingers 182 held normally in contact with the metallic rings of the range-controller, said fingers being secured to the finger-board by bolts or screws 183 and binding posts 181, as shown in Figs. 7 and 8.

The range controller forms an important feature of my system of sight setting, permitting the setting of the sights to any predetermined point by means of a motor driving the sight setting mechanism through any suitable transmission system and a keyboard or system of control in the conning tower, or central control station, and contact fingers on this range controller which determine the exact limit to which the sight will be moved.

In automatically operating the sight for range on one or more guns, I use a key-board K on which most of the parts shown in Fig. 5 are mounted. These parts include a range-relay coil 195 provided with an armature key 198, and a motor relay coil 189 provided with an armature key 192. A motor 108'' (Figs. 5, 6 and 2ª) is connected to the sight bar of the gun, as shown in Fig. 2ª. A reversing switch 113'', for changing the direction of the current and a rheostat 106', for varying the speed of the motor, are employed. A tell-tale light 185 is electrically connected with the armature key 198 of the range relay coil 195, so that when a desired range is reached the light will be extinguished.

When my system is applied to a number of guns, as shown in Fig. 6, the key-board will have the necessary number of range relay coils 195 and armature keys to accord with the number of rings in the range controller 165 (Fig. 7), one motor relay coil and armature key for each gun sight to be set, a double pole, double throw reversing switch 113'' and a rheostat 106', a tell-tale light 185 being electrically connected with each armature key 198. Each sight is provided with a motor 108'', which is electrically connected with and controlled by a motor relay coil 189 and armature key 192.

The circuits used in setting for range as applied to one gun, as shown in Fig. 5 are as follows: The circuit is from the positive conductor 184 at the key-board K, through lamp 185 to junction 186, from whence it passes to the range controller 165 on the sight, over conductor 187 through the range controller where contact is made by the selected finger in the finger-board 179, (the illumination of the lamp showing that contact has been made); the current passes through the range-controller to the negative finger 166 in contact with the negative ring 167 (Figs. 5, 6 and 7); thence over conductor 190 to motor relay coil 189; through said coil and over conductor 189' to the negative side of the line, thus completing the circuit of the coil 189 referred to, this being the first of five interconnected circuits. The second and third multiple circuits are inter-dependent as follows: The second circuit is through the range relay coil 195, when contacts 196 and 197 are closed, and also motor relay key 192, when the path is from the positive side of the line through contacts 191, key 192 and conductor 193 to junction 194. From 194 the circuit is over conductor 194' to contacts 196 and 197 to the range relay key 198 to the core of coil 195, thence through said coil 195 and over conductor 196' to the negative side of the line. This will give the current necessary to magnetize the core of 195 to retain range relay key 198 depressed until the sight has moved to the required point, and motor relay key 192 has been released as hereinafter described. It will be seen that when these two keys 192 and 198 are depressed another or third circuit is established, as already described, to the range relay key 198, then over conductor 187 to the range controller 165 by way of contact finger 182, to negative ring 167 and contact finger 166 to conductor 190. From this conductor the circuit is through coil 189 and conductor 189' to the negative side of the line, thus supplying current to retain the motor relay key 192 depressed as long as the contact finger 182 makes contact with the ring on the range controller. It will be seen that the currents in these two coils are dependent on each other, the closing of the armature contacts of one completing the circuit through the other. The fourth and fifth multiple circuits comprise the circuit of the armature of the motor 108'' and the circuit of the field 198' thereof.

The instant the armature key of a motor relay coil is closed, the motor starts, the direction depending upon the position of the double-pole, double throw switch 113''; the current from the main line 184 passes to the contacts 191, to armature key 192, over conductor 193 to junction 194, where the current divides, one part going as already described, the other passing over conductor 199'; through armature of motor 108'', and thence over conductor 200 to the negative side of the line. A part of the current passes over conductor 199' to junction 116'' and conductor 201; through double pole, double throw switch 113''; over either conductor 202 or 202'; thence through field 198, and back over the opposite conductor 202 or 202'; through double pole, double throw switch 113''; over conductor 203 and through rheostat 106' to the negative side of the line. When the sights of several guns are to be controlled I provide each sight with a range controller 165, each controller being mounted on the usual range dial shaft therefor, and each operated by an electric motor, as shown in Fig. 6.

The tell-tale lights are of very high resistance, so that a very small amount of current is used, as while their circuits are in series with the coils 189 of the motor keys 192, there will not be sufficient energy in said coils 189 to hold the keys 192 closed. When a circuit is open at a range controller, the tell-tale light of the particular circuit is instantly extinguished, but tell-tale lights of the circuits which remain closed will remain lighted, hence the operator will know which circuits are in readiness for the next operation. A small rheostat 106' is provided in the motor field circuit for controlling the speed of the motors.

In operation the range relay key 195 for the desired range is depressed but no circuit is established until one or more of the motor keys 192 is depressed; when this motor key 192 is depressed its motor instantly starts running in either direction, according to the position in which the reversing switch 113'' is thrown. With both keys 192 and 195 closed, a circuit is established which retains both keys closed until the motor raises or lowers the sights to the desired point or limit and as the range controller is mounted on the shaft of the range dial now in use and moving synchronously with it, it will be seen that when the desired range is reached the contact finger of the range sought will run on the insulation at that point of the range controller 165, opening the circuit through the common negative conductor 190 of the sight or sights being used, releasing the motor relay key 192, opening contacts 191 and stopping the motor, and also cutting out the tell-tale light of the range obtained.

As the circuits are the same for all the sights, it will only be necessary to trace the circuit of one sight, for example the sight of gun No. 4, for one change of range. Such circuit is as follows: Referring to Fig. 6, it is to be assumed that the conductors 105', from any suitable generator (not shown) are connected by a main switch 188 with the conductors 184 and 105''. The current flows from positive line 184 over said conductor to each motor relay key 192 in parallel. If motor relay key 192 of the sight of gun No. 4 be depressed, (range relay key 198 being first depressed) the current will flow through said key 192 over conductors 193 and 194' to the proper range relay coil 195; through said coil and back over conductor 196' to the negative side of the line 105'', magnetizing coil 195 and retaining key 198 depressed. Another circuit is formed when range relay key 198 is depressed, motor relay key 192 also being depressed, it being from positive line 184, to motor relay key 192, as before stated, thence over conductor 193 and 194' to the contacts (196 and 197, Fig. 5) of range relay coil 195, through key 198 over conductors 199 and 187 to range controller 165 of gun sight No. 4, through said controller back over conductor 190 to motor relay coil 189 of gun sight No. 4 through said coil and over conductor 189' to the negative side of the line, serving to retain motor relay key 192 depressed. The motor circuit is as follows: The field circuit is directly across the line when any particular motor relay key 192 is depressed, the current passing from positive line 184 to motor relay key 192 of gun sight No. 4, over conductors 193 and 201 to the double pole, double throw switch 113'', over conductor 202 to motor field 198' of the motor 108'' of gun sight No. 4 back over conductor 202' to switch 113'', over conductor 203 to rheostat 106', and to the negative side of the line 105''. By the means just described, armature current is also established through said key 192, thence over conductor 199' to the armature of the motor 108'' and back over conductor 200 to the common negative line 105''.

As a result of establishing the motor circuit, the motor will run, rotating the range controller 165 of gun sight No. 4 as heretofore stated, until the circuit is broken by the contact finger 182 reaching one of the insulations 168 indicating the selected or ascertained range. When this occurs, the motor relay coil 189 will be deënergized, resulting in the release of the motor relay key 192 opening the circuit at contacts 191, thus disconnecting all the devices from the positive side of the supply circuit 184. This opens both field armature circuits of the motor 108'' and causes it to stop, and also opens the circuit through the range relay coil 195, releasing its armature 198. It will further be seen that if more than one of the motor relay keys 192 have been depressed, then if one is released, it will stop its motor but will not cause the range relay key to be released until all the motor relay keys 192 have been released, thus causing each sight to move to its selected reading independent of any or all the others. It will be seen that the motor 108'' will act whenever, and just as long as, the motor relay key 192 is depressed, so it is important that key 195 be closed before key 192, and that the operator shall remove his finger as quickly as possible from key 192.

I will now describe the method of transmitting the range and the operation of the range controller 165 and the parts or devices and connections which coöperate therewith, starting with the assumption that the target is 12000 yards distant:—First the reversing switch 113'' (Figs. 5 and 6) is set to cause the motor 108'' to actuate the sight mechanism in the proper direction. Then the proper range key 198 is depressed to close the circuit through the proper contacts 196, 197, but nothing occurs until the proper or corresponding key 192 is depressed to close the circuit through contacts 191. The motor 108'' now rotates the controller 165 until the proper insulating area 168 arrives under the contact finger 182 to break the circuit through conductor 190, thus releasing key 192, resulting in stopping the motor with the range set at 12000 yards. If, for instance, the range is to be 12500 yards, the operator will simultaneously depress two keys 198, one for 12000 yards and the other for 500 yards. Movement of the controller 165 will continue until stopped at 12500 yards because, when two or more keys 198 are depressed, they all remain down so long as any current at all is flowing through the circuit which includes the contacts 191. All contact fingers 182 of the circuits of the keys depressed must be reached by insulation areas 168 of the controller 165 to effect the stoppage of the motor. If the range is to be less than that just effected and it is desired to reduce the range from, for instance, 12000 yards to 11,500 yards, the reversing switch 113'' is shifted to cause the motor 108'' to actuate the sight mechanism in the reverse direction from that just described. Now, the proper key 198 for 500 yard range is depressed, and the same operation as above described in connection with the 12000 yard range occurs, the controller 165 moving backwardly.

I will now explain the reason for providing the controller 165 with two series of alternating conducting and insulating areas for each of the short ranges as indicated in Fig. 7:—If at any time the controller 165 has stopped with both of two fingers 182 which had been used as above described now bearing on insulating areas 168, and it is desired to make a step in either direction of 1000 yards or less, the operator then uses the duplicate key 198 for the second or duplicate short range. In other words, suppose it is desired to step the controller an advance of 500 yards, it being understood that there are two contact fingers 182 for each of the short range series, one of said fingers will be resting on an insulating area and the operator will depress the key 198 of the circuit which includes the other finger 182 that is necessarily at this time bearing on a conducting area. The telltale lights 185 inform the operator which of the duplicate keys 198 to depress. In case of a reversal, the operator momentarily holds down the key 198 of the circuit which includes the finger 182 that is bearing on an insulating area until that area has passed, and the adjacent or following conducting area arrives under said finger. He can then immediately remove his pressure from said key 198 which will then remain in depressed position, and the above described operation will follow.

For azimuth or right and left deflection, I provide each sight mechanism with a specially constructed azimuth drum 102 in addition to the usual azimuth drum 100 now in use, but it will be understood that the drum 100 is not essential to the operation of my system, as my drum 102 is graduated so as to show the deflection of the sights to the right or left, as hereinafter explained.

By referring to Fig. 1 it will be seen that the drum 100 is rotatably mounted on a shaft 113, which is supported upon the rear end of the sight bar 99, said drum being rotated by the hand wheel 101, which also rotates my drum 102 as it is mounted on a shaft 112 which is connected to and forms an extension of the shaft 113 on which drum 100 is mounted as shown at 114, Fig. 1. Thus it will be seen that both drums will have a vertical up and down movement as the sight bar is raised or lowered. The connection between shaft 113 and its extension shaft 112 consists of a pinion 123 rigidly mounted on the upper end of shaft 113 and having a threaded socket 114 indicated by dotted lines in Fig. 1, the lower end of extension shaft 112 being screwed into said socket. The azimuth drum 100 is provided with the usual pointer 108 carried by a fixed bracket 107, so that as said drum is moved up or down by the elevation or depression of the sight bar 99 the change in range will be indicated by the pointer 108. Right and left deflection is accomplished by the usual mechanism, consisting of the hand wheel 101 (Figs. 1 and 2) mounted on the shaft 121, which is provided with a worm 121' in mesh with the usual worm wheel (not shown) mounted on the shaft 113. The pinion 123 of shaft 113 is in mesh with the usual rack bar 122 of the sight bar, so that a rotary movement of the shaft 113 in either direction, will cause the sight bar to be deflected to the right or left.

As above stated, the drum 102, owing to its graduation, shows the deflection to the right or left. This is due to the interengagement of rack bar 122 with the pinion 123 of drum shafts 112, 113. The drum 102 has its exterior surface provided with strips 103 (Fig. 3) of insulation, between which are metal conductors 104, and at its bottom a short-circuiting band 138, and mounted on the upper end of a bar 105 (Fig. 1) is a contact 106 which is suitably insulated and is adapted to make electrical contact with the conductors 104, said bar being supported by the bracket 107. The drum 102 is provided with a central or zero strip 109, and the insulating strips 103 run convergingly from bottom to top to correspond with the graduations on drum 100 and are numbered from 2 to 90, as shown in Fig. 3. When making the first calculations for the proper setting of the sight for deflection, allowance is made for a given windage and speed of the ship or target, at zero or point blank range. As this, for well understood reasons, varies with variations of the range (the distance that the projectile is to travel), and as the range and deflection variations do not relatively change at a constant rate, the graduations represented by the strips 103, 104, diverge at a rate to correspond with these changes. This necessitates the maintaining of contact 106 with the proper strip 104 of the drum as the range changes, as hereinafter described. If contact 106 is maintained in contact with the selected strip 103, the proper deflection for the different ranges will be maintained. It will be noted that the drum 102 is supported on the sight bar and moves up and down with it but that the point 106, being fixed to another part of the sight mechanism does not move vertically with the drum and so tends to travel over its surface with any change of range, making and breaking contact as explained hereinafter. Situated near the lower end of the drum 102 is a contact-block 110 carrying two contact points 111 arranged to make contact with the conductors 104, as said drum revolves. At zero range, the pointer 108 and the contact 106 of the respective drums will be in the positions shown in Fig. 1, but when the range is increased, the position of the pointer 108 and the contact point 106, relatively to the drums, will necessarily change, (due to the elevation of the sight bar). In the preferred form, the relationship of contacts 111 and 106, instead of being as indicated in Fig. 1, will be one directly above the other as shown in Fig. 3. An electric motor 115 is employed to drive the shaft 112 on which the drum 102 is mounted, and as said drum is revolved and the sight bar elevated, the continued revolution or upward movement of the drum 102 will cause a change in the position of the contact point 106 relatively to the drum, but not of the contact points 111.

The driving mechanism which connects the motor with the drum 102, consists of a worm 112' (Figs. 1 and 2) on the motor shaft, meshing with a gear wheel 113' on a shaft 114' journaled in suitable supports 115', 116 and 117 projecting from the sight bar. The shaft 114' is provided with a worm 118 meshing with a gear wheel 119 on an extension 120 of the shaft 121 carrying the hand wheel 101 formerly employed to operate the drum 100, as shown in Fig. 2. It is to be understood that in practice, if the shaft 121 is to be rotated by hand as well as by power, it will be necessary to provide a suitable clutch to disengage some members, such as the worm 118 from worm wheel 119, in order to enable hand operation to be performed. Such, however, forms no part of my invention, and is neither illustrated nor claimed herein.

When a current of electricity is supplied to the motor, the connections including the worm 112', worm wheel 113' and shaft 114' impart a rotary motion, through the medium of the worm 118 and gear-wheel 119, to the shaft extension 120, and thereby to the drum 102 through the medium of worm 121' and the usual worm wheel (not shown) mounted on the shaft 113. The elevation of the sight bar will move said drum upward and when it is has moved upward a sufficient distance to bring the contact 106 upon an insulated strip 103 the motor will stop. The particular strip 103 with which it is desired the contact 106 shall maintain engagement is first selected by means of contact points 111, and coöperating circuits, as hereinafter described. Such particular strip 103 corresponds with the desired degree of deflection transmitted from the conning tower or other control station.

Referring to Fig. 3 which represents diagrammatically the operation of the azimuth drum 102, the reference characters 124, 125 and 126 indicate respectively three switch relays of a key-board for operating the circuits, each switch relay being provided with an armature 127 operated as a key. Located above the armature keys of the switch relays 124 and 125 is a connecting strip 128 of suitable insulating material, provided with clips 129 upon its underside, cross connected by copper conductors 130, the outer end of one outer conductor terminating in a binding screw 131, and the outer end of the other outer conductor terminating in a binding screw 131', the clips 129 being adapted to be short circuited by clips 132 upon the upper side of the armature keys 127, when said armature keys are released from contact position, the clips 132 being insulated from their armature keys. The key board includes a double pole, double throw switch 136, and the azimuth setting mechanism of each sight is provided with an electric motor 115, all motors being in electrical communication with each other. Azimuth or right and left deflection is accomplished by the operation of keys 127, 127, alternately.

The current of the motor circuit is from the positive line when either of the armature keys 127 is depressed, and enters at 148 by way of contact 133 and passes through the depressed armature key 127 to a shaft 133', which acts as a pivot for said key, from whence it passes over conductor 134 to screw 135 on the double pole, double throw switch 136, where the current divides, the motor armature current passing over the conductor 137 through the armature of motor 115, and over conductor 139 to the negative side of the line. The reversible field current, which is taken off from conductor 134 at screw 135, flows through the double pole, double throw switch blade 136 and over cross-connecting conductor 141 to the button 142, over conductor 143 to field 204 of motor 115, then over conductor 144 to button 145 on the double pole, double throw switch through switch blade 146; and over conductor 147 to the negative side of the line, the double pole, double throw switch being cross-connected to cause field reversal.

The third circuit, which is formed when either of the armature keys 127 is depressed, is through the coils 124 or 125; for example, if armature key 127 of coil 124 is depressed the current enters the armature key at 148, by way of contact 133, and passes through the armature key to shaft 133', as before stated. From said shaft the current passes over a short conductor 149 to coil 125, and over conductor 150 to contact point 111, thence through a contact strip of drum 102 and its short-circuiting band 138 to common contact point 111', and over conductor 152 to the negative side of the line, so that when an armature key is depressed, it will remain down until one of the contact points 111 runs onto an insulating strip 103, when the circuit will be opened and the armature key released. This opens all circuits of this armature key, and of course the motor 115 stops acting. The keys 127 are alternately operated until the desired degree of deflection is obtained.

The fourth circuit is from the positive side of the line over conductor 153 to the screw 131 on the cross connecting strip 128, thence over conductors 130 which short circuit the clips 129 when engaged by blade 132 of key 127. From conductors 130 the current passes over conductors 154 and 155 to coil 126, through said coil and over conductor 156 to contact point 106, thence through a conductor 104 of the drum 102 to common contact 111', and over conductor 152 to the negative side of the line, it being understood that the coil 126 becomes energized as soon as the contact point 106 makes contact with the conductor of the drum 102.

The object of the last described circuit and the contact 106 and coil 126, is to maintain the desired deflection when the range is changed, it being understood that the contact 106 is to automatically compensate for range changes, hence the placing of the short circuiting clips 129 over the two keys 127, so that when the keys 127 are not operated and a change in range is given, contact 106 will be in a different position relatively to the drum 102 and if contact is made by the contact 106 with a conductor 104 of said drum 102 the circuit will be cut in through coil 126, the motor will then be cut in and the drum revolved until contact 106 runs on an insulating strip 103 between the conductors 104, and breaks the circuit. In other words the last described circuit corrects deflection while the range is being changed, during which operation the drum 102 will have a longitudinal movement as the sight bar is raised or lowered. If contact 106 is in contact with one of the conducting strips 104 a circuit will be established through coil 126, if both keys 127 are in their raised positions with the short-circuiting clips 132 between the clips 129. When coil 126 is energized it closes a circuit from the motor 115, the current going from the positive side of the line to the contact of relay 126, armature of the relay, motor 115 and back to the negative side of the line over conductor 139. The field 204 of the motor 115 being continuously energized, the motor will begin running, causing the drum 102 to be revolved a slight distance, sufficient to carry contact 106 off of the conductor 104, with which it has been in contact, whereby the circuit of relay 126 will be broken, allowing its armature to rise, breaking its circuit of motor 115 and thereby preventing further rotation of the drum 102 and the deflection of the sight bar. It is to be understood that as shown in Fig. 3, the contact 106 corrects the azimuth drum only when the range is changed in a single direction. In order that said contact may be correct for changes in range in the opposite direction it is necessary to first reverse the switch 136.

It will be understood that the right and left deflection movements will be accomplished at all sights in parallel, simultaneously, as all motors are in electrical connection with each other by means of the positive and return conductors leading from the motors so that each circuit formed at any sight will be simultaneously formed at each of the other sights, the motor armature circuits being over the positive conductor 137', (leading from conductor 137) and back over return conductor 139' leading from conductors 139. The reversible field circuit is over conductor 143' (a continuation of conductor 143) to the other sight and back over conductor 144', (a continuation of conductor 144.)

Having now described my invention, what I claim is:

1. In a limit system of gun control, the combination with the sights of a plurality of guns, an azimuth drum connected with each of the gun sights, each of said drums having alternating insulating and conducting areas corresponding with the desired setting, an electric motor for each drum, electrical connections between the motors, a distant key-board for electrically-setting the deflection of said sights, and electrical connections between the motors, drums and keyboard.

2. In a limit system of gun control, the combination with the sight of a gun, an azimuth drum connected with said gun sight, said drum having alternating insulating and conducting areas corresponding with the desired settings, an electric motor for said gun, a distant keyboard for electrically setting the deflection of said sight, and electrical connections between said motor, drum and keyboard.

3. The combination with the sight bar of a gun, of means for electrically moving the sight bar, said means including a range controller comprising a number of isolated areas representing different range units, and a plurality of keys located at a distant point for transmitting the range to said controller.

4. The combination with the sight bar of a gun, of means for electrically moving the sight bar, said means including a range controller comprising a number of isolated areas representing different range units, means for electrically operating said range controller from a distant point, and means whereby said controller may be stopped at a point corresponding to the desired range.

5. The combination with the sight bar of a gun, of means for electrically moving the sight bar, said means including a range controller comprising a number of isolated areas representing different range units, a range relay key in electric connection with the controller, an electric motor for operating the controller, and a motor relay key for controlling the motor.

6. In a system of gun-control, the combination with the sight bar of a gun, of a rotary member having a series of alternating make and break portions corresponding with the desired settings of the sight bar, connections whereby said member and the sight bar move synchronously, a motor for imparting continuous movement to both the sight bar and rotary member when in operation, and electrical connections controlled through the make and break portions of said rotary member for determining the limit of movement imparted by said motor.

7. Apparatus of the character described comprising a gun having a sight movably mounted relatively to the gun, a motor for moving the sight, said motor having operating connections with the sight whereby the sight is moved continuously to any degree without interruption during the operation of the motor, and selective means controllable from a distant point for starting the operation of the motor and prescribing the operation of the motor and movement of the sight to an exact pre-determined limit.

8. Apparatus of the character described comprising a gun having a sight mounted to move relatively to the gun in either one of two directions, motors for moving the sight, said motors having operating connections with the sight whereby one of the movements of said sight may be effected, without interruption, to a selected degree, and means controllable from a distant point for starting the operation of the motor and prescribing the operation thereof and the movement of the sight to an exact predetermined limit in either one of said two directions of movement.

9. In a system of gun-control, the combination with a gun of a sight mounted to move relatively to the gun in either one of two directions for the range and deflection, a range controller and a deflection controller, and means whereby movement of one which would necessitate an adjustment of the other will result in automatically effecting that adjustment.

10. In a system of gun-control, the combination with the sight bar of a gun, of a rotary member having a series of alternating make and break portions, connections whereby said member and the sight bar move synchronously, a motor for imparting continuous movement to both the sight bar and rotary member when in operation, a series of selective, manually-controlled members whereby a predetermined limit of movement of the sight bar can be obtained, and electrical connections controlled through the make and break portions of said rotary member for determining the limit of movement imparted by said motor.

11. In a system of gun-control, the combination with the sight bar of a gun, of a rotary member having a series of alternating make and break portions corresponding with the desired settings of the sight bar, connections whereby said member and the sight bar move synchronously, a motor for imparting continuous movement to both the sight bar and rotary member when in operation, electrical connections controlled through the make and break portions of said rotary member for determining the limit of movement imparted by said motor, and an indicator for showing when the desired limit of movement of the sight bar has been reached.

12. In a system of gun-control, the combination with the gun-sight thereof, of an azimuth drum supported by the gun-sight, said drum having alternating insulating and conducting areas corresponding with the desired settings, an electric motor for revolving the drum in either direction, a distant key-board, and electrical connections between the drum and key-board, whereby the sight bar may be deflected to the right or left.

13. A system of gun-control having in combination the gun-sight thereof, an azimuth drum composed of alternate metal and insulated strips, the insulated strips representing degrees of deflection, an electric motor for revolving the drum in either direction, control-points arranged to contact with the insulation strips on the drum, a key-board, and electrical connections between the drum and key-board, whereby right or left deflection may be imparted to the sight bar.

14. In a system of gun-control the combination with the sights of a plurality of guns, of an azimuth drum connected with the sight of each gun, each of said drums having alternating insulating and conducting areas corresponding with the desired settings, an electric motor for each drum, electrical connections between the drums, and a distant key-board for electrically transmitting the deflection to any one or any number of said sights.

15. A system of gun-control comprising a plurality of guns, each having a sight bar, a range-controller for each gun, each range-controller being provided with segments or limits representing range units, suitable electrical connections with each range-controller, an electric motor for operating each controller, and a key-board whereby the range may be electrically transmitted to each controller.

In testimony whereof I affix my signature, in the presence of two witnesses.

ARTHUR H. WEGNER.

Witnesses:
HARRY VORTRIEDE,
LUCIUS B. SWETT.

Copies of this patent may be obtained for five cents each, by addressing the "Commissioner of Patents Washington, D. C."